Patented Jan. 22, 1929.

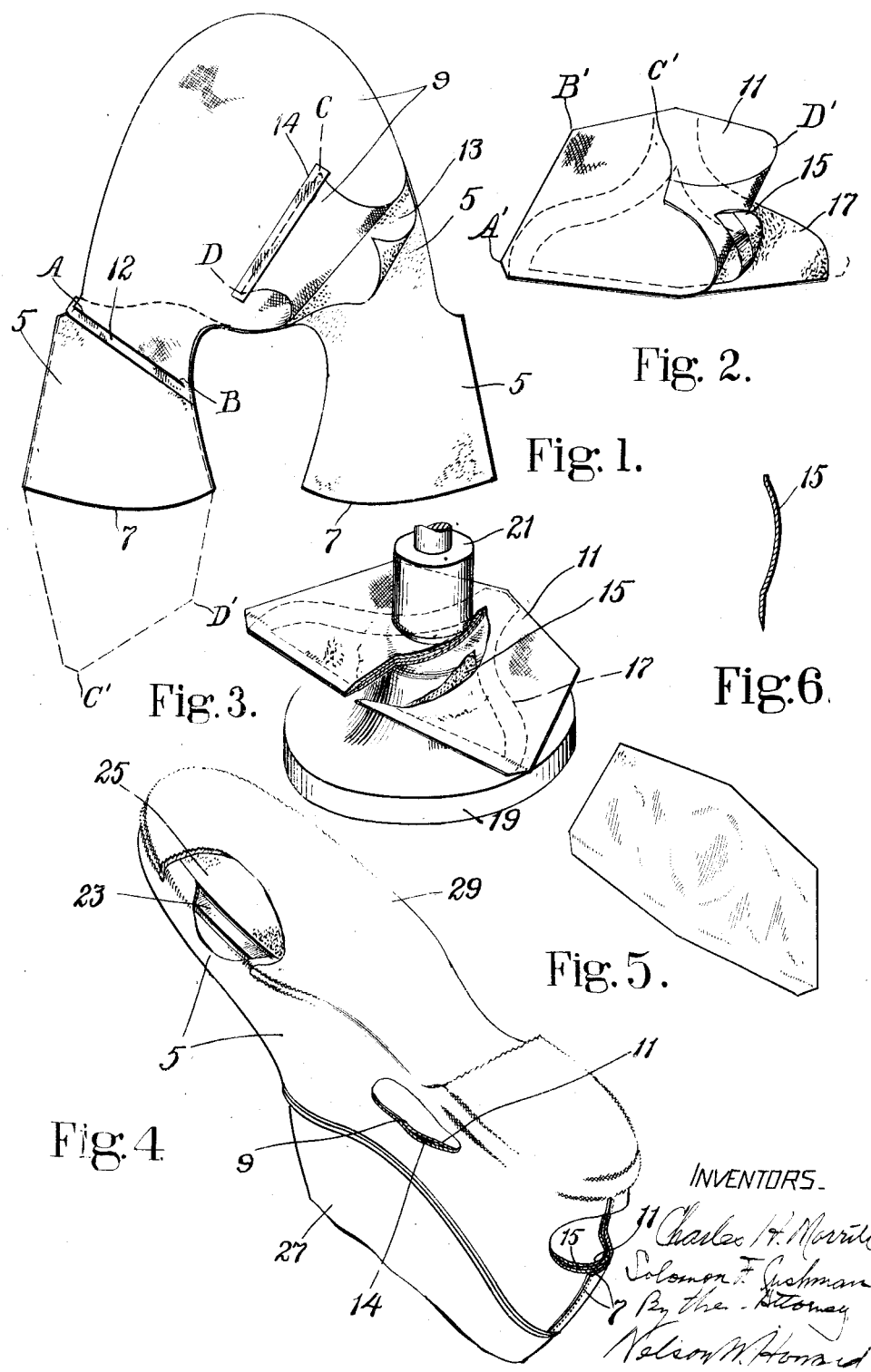

1,699,669

UNITED STATES PATENT OFFICE.

CHARLES H. MORRILL, OF SWAMPSCOTT, AND SOLOMON F. CUSHMAN, OF BEVERLY, MASSACHUSETTS, ASSIGNORS TO UNITED SHOE MACHINERY CORPORATION, OF PATERSON, NEW JERSEY, A CORPORATION OF NEW JERSEY.

VULCANIZED SHOE AND METHOD OF MANUFACTURE.

Application filed May 1, 1922. Serial No. 557,656.

This invention relates to the manufacture of footwear and is herein set forth in connection with a rubber overshoe and the method employed in its manufacture.

Rubber overshoes are commonly made by one or the other of two methods. In one method the overshoe is built up piece by piece upon a last. In the other method the upper is assembled more or less completely off the last. It is then placed together with an innersole upon a last, and subjected to the lasting operation.

The present invention has to do with an improved piece of footwear made by the latter method and with an improv d method of making it. Hitherto in the manufacture of rubber overshoes there has been a joint in the lining at the rear end of the shoe. According to one aspect of the present invention this joint has been obviated. This greatly contributes to the length of life of the overshoe, since it provides a smooth surface on the inside of the overshoe in a locality which is subjected to a great deal of wear in the frequent putting on and taking off of the overshoe.

It is desirable that a piece of footwear of this kind should have a pronounced curve at the rear end from top-to-bottom as well as transversely so that it will hug the shoe of the wearer; but the counter or rag junior commonly employed is comparatively stiff and bulky and tends to interfere with the satisfactory lasting of the upper about the rear portion of the last. In another aspect the invention comprises the use of a vulcanizable counter which is previously molded. By employing a counter of this kind which is shaped partly or wholly to correspond to the shape of the rear portion of the last, the rear portion of the upper may be made to conform more nearly to the shape of the corresponding portion of the last.

Referring now to the accompanying drawings:—

Figure 1 is a plan showing in full lines a composite member comprising an outer, a gum inner vamp and the forepart of a lining, and in dotted lines a composite member comprising the rear part of the lining, a friction junior and a rag junior, the two composite members being in process of being assembled into a closed or endless upper.

Figure 2 is a plan of the second-named composite member.

Figure 3 is a perspective showing the composite member of Figure 2 being subjected to a molding operation.

Figure 4 is a perspective of a finished overshoe.

Figure 5 is a perspective of the composite member of Figure 2 after it has been molded; and Figure 6 is a vertical section through the rear portion of the molded counter.

In the manufacture of the illustrative shoe, there is provided a one-piece outer 5 of rubber or rubberized material the free ends 7 of which may be joined to form a closed or endless outer. The lining of the overshoe is made in two parts, a forepart 9 and a rear part 11 of such shapes that when the edges of the forepart are joined to the edges of the rear part a closed or endless lining will result which will cover the inside of the closed outer. In joining the parts of the lining, as will presently be explained, the edge A' B' of the rear part is joined to the edge A, B of the forepart, and then the parts are bent and the edge C' D' of the rear part is joined to the edge C, D of the forepart.

The forepart 9 of the lining, to the edges A, B and C, D of which have been attached strips 12 and 14 of adhesive tape, is placed upon the inside face of the forward portion of the outer 5 in the manner shown in Figure 1, a gum inner vamp 13 being interposed if desired. It will be understood that the lining is frictioned on the side next to the outer and that consequently the pieces will adhere if pressed firmly together. They may be so pressed by passing them through a rolling machine or in any other suitable manner. The strips of adhesive tape 12 and 14, it will be noted, project beyond the edges A, B and C, D of the forepart 9 of the lining in position to permit butt joints to be formed between these edges and the edges A' B' and C' D' of the rear part 11 of the lining.

Upon the rear part 11 of the lining is placed a rag junior 15 and a friction junior or counter 17, these parts being then also rolled or otherwise pressed into firm adhesive contact. The assembled piece shown in Figure 2, which is to form the rear end of the inside of the finished shoe, is at this stage flat. In the finished shoe it should be curved convexly outward and from top to bottom as shown in Figure 4. It is difficult, owing to the stiffness of the parts, to get the desired curvature by the subsequent pulling-over and lasing operations. In order, therefore, to facilitate the production of this desired curvature, the piece shown in Figure 2 consisting of the rear part of the lining and the members 15 and 17 is subjected to a molding operation. As shown in Figure 3, this may be accomplished by placing the piece upon a cupped anvil 19 and striking it with a hammer 21 the operative face of which is convexly curved. The effect of this is to impart to the piece a convexity which will extend outwardly when the parts of the upper have been assembled to form a closed upper and will facilitate the production of the desired curvature at the heel end of the finished shoe. It will be understood that neither the fabric lining nor the friction junior have enough body to retain permanently the shape imparted to them by the molding operation. The rag junior or counter 15, however, has sufficient body and is of such material that it will retain its molded shape at least until the upper has been placed upon the last. During the lasting operation its curvatures becomes the same as that of the heel end of the last, and the subsequent vulcanizing operation renders the curvature permanent. It is this member which, when unmolded, causes the chief difficulty in drawing the heel portion of the upper down to the last since it is comparatively thick and stiff. Figure 5 shows in perspective the result accomplished by the molding operation illustrated in Figure 3. A locality near the middle of the composite member is given a concavo-convex shape, said locality being circular or oval in outline and projecting outwardly of the composite member. In Figure 6 the counter or stiffening member 15 is shown in section. It should be particularly noted that the molded portion of the counter is of such shape and size and so located that even after the counter has been molded it may be laid on a plane surface with all of its inner face except the molded portion in contact with said surface. The capability of lying flat to the extent pointed out is not paricularly material to the manufacture of the specific shoe illustrated but is very desirable when such a counter is to be incorporated in certain other vulcanized footwear. In the illustrative shoe the lining material as well as that of the friction junior is rubberized and vulcanizable; and with such materials it is desirable that the rubberized rag junior or counter should be pressed into adhesion with the other parts before the molding operation is carried out. It should be understood, however, that whether the vulcanizable counter is molded alone or with parts of the lining attached to it depends upon the type of shoe which is being made.

After the two composite pieces which are to form the complete upper have been prepared in the manner which has been described above, they are put together in the following manner. Referring to Figures 1 and 2, both pieces are shown with the lining parts uppermost. With the parts in this position, the edge A' B' of the rear part 11 is butted against the edge A, B of the forepart 9, and the butt joint rolled or pressed, the strip of tape 12 serving to hold the butt joint fast. At this time the two composite pieces of the upper, that shown in Figure 1 and that shown in Figure 2, are flat. The operator now places a finger in the locality of the edge C, D to hold that side of the composite piece down upon the bench or table upon which the assembling is being done. He then lifts the other side, butts the edge C' D' against the edge C, D and rolls the joint. During this latter operation the lining is closed so that the upper assumes a shape which approximates that which it has in the finished shoe except that the ends 7 of the outer are not yet joined. The rear ends of the outer are now brought together and overlapped. This may be done without the use of a form if desired; but preferably the upper is placed right side out upon a form which has a supporting surface approximating that of the heel end of a last. This leaves the hands of the operator free and facilitates the proper joining of the free rear ends 7 of the outer, the joint being preferably a lapped one.

The upper is now completely assembled in closed or endless form ready to be lasted. The remaining steps in the manufacture of the shoe are carried out in the following manner. The assembled upper, together with the usual insole 23 and filler sole 25, are placed upon a last 27 and the margin of the upper is lasted over the edge of the insole with its edge abutting the edge of the filler sole, the parts which form the upper having been cut to finished size so that the abutting relation of the edge of the upper and the edge of the filler sole is made possible. The outer sole 29 is then properly attached with the aid of cement and pressure, and the shoe is vulcanized.

In a shoe of this kind the rear end of the upper by reason of the preliminary molding conforms to the shape of the heel end of the last; and the exposed rear portion of the lining has no seam or joint but is perfectly smooth. Moreover, the method of preparing the parts of the upper and assembling them may be carried out rapidly and accurately.

In order to promote brevity and clearness the manufacture of a particular kind of shoe, namely a rubber overshoe, has been described; but it should be understood that the invention is not limited in the scope of its application, except as defined in the claims, to the particular shoe which has been described nor to the particular shape or number of parts shown nor to the particular order in which the parts are put together.

The method of making a rubber or rubberized shoe which comprises broadly building the upper off the last and subsequently lasting it is not herein claimed but forms the subject-matter of a prior application Ser. No. 271,397, filed in the name of Morrill, now Patent No. 1,506,074.

Having thus described our invention, what we claim as new and desire to secure by Letters Patent of the United States is:—

1. A rubber overshoe comprising a one-piece outer and a lining completely covering the inside of the outer, said lining comprising two pieces joined together from top to bottom at localities between the ends of the shoe.

2. A rubber overshoe comprising a one-piece rubber outer having a joint at the rear end of the shoe and a two-piece lining the parts of which are joined at the sides of the shoe.

3. A rubber overshoe comprising a one-piece rubber outer having a joint at the rear end of the shoe, and a two-piece lining having a jointless portion extending across the joint of the outer.

4. The method of making a vulcanized shoe which comprises building a composite member including an entire outer and the forepart of the lining, building a composite member including the rear part of the lining and a counter stiffener, assembling the composite members in such manner as to form a closed upper, placing the upper thus made upon a last, and completing the manufacture of the shoe including subjecting it to vulcanization.

5. The method of making a vulcanized shoe which comprises building in the flat a composite member including an entire outer and the forepart of the lining, building also in the flat a composite member including the rear part of the lining and a counter stiffener, assembling the composite members in such manner as to form a closed upper, placing the upper thus made upon a last, and completing the manufacture of the shoe including subjecting it to vulcanization.

6. The method of making a vulcanized shoe which comprises building a composite member including an entire outer and the forepart of the lining, building a composite member including the rear part of the lining and a counter stiffener, subjecting the lining and stiffener to a molding operation, assembling the composite members in such manner as to form a closed upper, placing the upper thus made upon a last, and completing the manufacture of the shoe including subjecting it to vulcanization.

7. The method of making a vulcanized shoe which comprises building a composite member including an entire one-piece outer and the forepart of the lining, building a composite member including the rear part of the lining and a counter stiffener, joining the composite members in such manner as to form a closed upper, placing the upper thus made upon a last and completing the manufacture of the shoe including subjecting it to vulcanization.

8. The method of making a vulcanized shoe which comprises building a composite member including a one-piece outer and the forepart of the lining, building a composite member including the rear part of the lining and a counter stiffener, subjecting the lining and stiffener to a molding operation, joining the composite members in such manner as to form a closed upper, placing the upper thus made upon a last and completing the manufacture of the shoe including subjecting it to vulcanization.

9. The method of making a shoe which comprises providing an outer of rubber or rubberized material adapted to have its free ends joined at a locality which will be located at the rear end of the finished shoe and a two-piece lining adapted to have the free ends of the two pieces joined at localities which will be located at the sides of the finished shoe, placing the outer and the lining in superposed relation, making the joints to form an assembled upper, and completing the manufacture of the shoe including subjecting it to vulcanization.

10. The method of making a shoe which comprises providing an outer of rubber or rubberized material adapted to have its free ends joined at a locality which will be located at the rear end of the finished shoe and a two-piece lining adapted to have the free ends of the two pieces joined at localities which will be located at the sides of the finished shoe, placing the outer and the lining in superposed relation, making the joints to form an assembled upper, placing the assembled upper together with an innersole upon a last, and completing the manufacture of the shoe including subjecting it to vulcanization.

11. The method of making a shoe which comprises providing a one-piece outer of rubber or rubberized material adapted to form a closed outer when its rear ends are joined, and a two-piece lining adapted when joined at two localities intermediate its ends to form a closed lining, placing the outer and lining in superposed relation, making the joints, and completing the manufacture of the shoe including subjecting it to vulcanization.

12. The method of making a shoe which comprises providing a one-piece outer of rubber or rubberized material adapted to form a closed outer when its rear ends are joined, and a two-piece lining adapted when joined at two localities intermediate its ends to form a closed lining, placing the outer and lining in superposed relation, making the joints to form a closed upper, placing the upper together with an innersole upon a last, and completing the manufacture of the shoe including subjecting it to vulcanization.

13. The method of making a shoe which comprises providing a one-piece outer and a two-piece lining including a forepart and a rear part, placing the forepart of the lining upon the forepart of the outer, placing the rear part of the lining on the rear part of the outer with the edges of the rear part of the lining and the edges of the forepart of the lining in abutting relation, overlapping the rear edges of the outer to form an assembled upper, placing the upper upon a last and completing the manufacture of the shoe.

14. The method of making an upper for a rubber shoe which comprises providing a one-piece outer adapted to have its free ends joined at the rear of the upper, and a two-part lining comprising a forepart and a rear part adapted to have the free ends of the two parts joined at localities at the sides of the upper, superposing the forepart of the lining upon the forward portion of the outer and pressing the lining piece and outer together, superposing a stiffening member upon the rear part of the lining and pressing them together, joining corresponding edges of the two parts of the lining to form a closed lining and joining the free ends of the outer to form an assembled closed upper.

15. The method of making a shoe which comprises molding a vulcanizable counter stiffening member prior to incorporating it in a shoe, incorporating the molded member in a shoe and completing the manufacture of the shoe including subjecting it to vulcanization.

16. The method of making a shoe which comprises providing an outer and a lining of vulcanizable material, attaching to the rear portion of the lining a comparatively thick substantially flat counter stiffening member also of vulcanizable material, molding the stiffener while it is attached to the lining, assembling the lining, stiffener and outer to form an upper, and completing the manufacture of the shoe including subjecting it to vulcanization.

In testimony whereof we have signed our names to this specification.

CHARLES H. MORRILL.
SOLOMON F. CUSHMAN.